(12) United States Patent
Guo et al.

(10) Patent No.: US 9,237,344 B2
(45) Date of Patent: Jan. 12, 2016

(54) DERIVING CONTEXT FOR LAST POSITION CODING FOR VIDEO CODING

(71) Applicant: QUALCOMM Incorporated, San Diego, CA (US)

(72) Inventors: Liwei Guo, San Diego, CA (US); Marta Karczewicz, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 13/796,572

(22) Filed: Mar. 12, 2013

(65) Prior Publication Data

US 2013/0251041 A1 Sep. 26, 2013

Related U.S. Application Data

(60) Provisional application No. 61/614,178, filed on Mar. 22, 2012, provisional application No. 61/620,273, filed on Apr. 4, 2012, provisional application No. 61/666,316, filed on Jun. 29, 2012.

(51) Int. Cl.
*H04N 7/26* (2006.01)
*H04N 19/51* (2014.01)
*H04N 19/513* (2014.01)
(Continued)

(52) U.S. Cl.
CPC ....... *H04N 19/00684* (2013.01); *H04N 19/122* (2014.11); *H04N 19/13* (2014.11); *H04N 19/18* (2014.11); *H04N 19/186* (2014.11); *H04N 19/513* (2014.11); *H04N 19/91* (2014.11)

(58) Field of Classification Search
CPC ............ H04N 19/00684; H04N 19/13; H04N 19/513; H04N 19/18; H04N 19/91; H04N 19/186; H04N 19/122
USPC ........................................ 375/240.16, 240.12
See application file for complete search history.

(56) References Cited

U.S. PATENT DOCUMENTS

| 7,724,818 B2 | 5/2010 | Hannuksela et al. |
| 2010/0007532 A1 | 1/2010 | Tanaka et al. |

(Continued)

FOREIGN PATENT DOCUMENTS

| EP | 1933568 A2 | 6/2008 |
| WO | 2008084443 A1 | 7/2008 |

(Continued)

OTHER PUBLICATIONS

International Preliminary Report on Patentability from International Application No. PCT/US2013/030886, dated Jul. 1, 2014, 20 pp.

(Continued)

*Primary Examiner* — Tung Vo
*Assistant Examiner* — Zaihan Jiang
(74) *Attorney, Agent, or Firm* — Shumaker & Sieffert, P.A.

(57) ABSTRACT

In one example, a device includes a video coder configured to determine a context for entropy coding a bin of a value indicative of a last significant coefficient of a block of video data using a function of an index of the bin, and code the bin using the determined context. The video coder may encode or decode the bin using context-adaptive binary arithmetic coding (CABAC). The function may also depend on a size of the block. In this manner, a table indicating context indexes for the contexts need not be stored by the device.

21 Claims, 5 Drawing Sheets

(51) Int. Cl.
*H04N 19/13* (2014.01)
*H04N 19/122* (2014.01)
*H04N 19/91* (2014.01)
*H04N 19/186* (2014.01)
*H04N 19/18* (2014.01)

(56) References Cited

U.S. PATENT DOCUMENTS

| | | | |
|---|---|---|---|
| 2011/0110416 A1* | 5/2011 | Lawrence | 375/240.01 |
| 2012/0014454 A1 | 1/2012 | Budagavi et al. | |
| 2012/0140814 A1* | 6/2012 | Sole Rojals et al. | 375/240.02 |
| 2012/0163456 A1* | 6/2012 | Coban et al. | 375/240.13 |
| 2012/0163472 A1* | 6/2012 | Sole Rojals et al. | 375/240.24 |
| 2012/0170857 A1 | 7/2012 | He et al. | |
| 2012/0183235 A1 | 7/2012 | Sasai et al. | |
| 2013/0003849 A1* | 1/2013 | Chien et al. | 375/240.16 |
| 2013/0114676 A1* | 5/2013 | Guo et al. | 375/240.02 |
| 2013/0114730 A1* | 5/2013 | Joshi et al. | 375/240.18 |
| 2013/0202026 A1* | 8/2013 | Fang et al. | 375/240.02 |
| 2013/0336382 A1* | 12/2013 | Sole Rojals et al. | 375/240.02 |
| 2014/0140400 A1* | 5/2014 | George et al. | 375/240.12 |

FOREIGN PATENT DOCUMENTS

| | | |
|---|---|---|
| WO | 2011128268 A1 | 10/2011 |
| WO | 2011142817 A1 | 11/2011 |

OTHER PUBLICATIONS

Auyeung et al., "Context reduction of the last transform position in JCTVC-D262 for CE11.1", JCT-VC meeting; MPEG meeting; Mar. 16-23, 2011; Geneva, CH; (Joint Collaborative Team on Video Coding of ITU-T SG.16 and ISO/IEC JTC1/SC29/WG11); 6 pp.

Bross et al., High Efficiency Video Coding (HEVC) text specification draft 10 (for FDIS & Last Call), Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, Document JCTVC-L1003_v34, 310 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, JCTVC-I1003_d2, 290 pp.

Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE, Jul. 11-20, 2012, JCTVC-J1003_d7, 261 pp.

Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, 290 pp.

Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, CH, Nov. 21-30, 2011, 214 pages.

Fang et al., "Chroma Context reduction for Last Coefficient Position Coding in HEVC", JCT-VC Meeting; MPEG Meeting; Feb. 1-10, 2012; San Jose, CA; (Joint Collaborative Team on Video Coding of ITU-T SG.16 and ISO/IEC JTC1/SC29/WG11); 2 pp.

Guo et al., "CABAC Contexts Reduction for Last Position Coding," Joint Collaborative Team on Video Coding (JCT-VC) of ITU-T SG16 WP3 and ISO/IEC JTC1/SC29/WG11, 8th Meeting, San Jose, JCTVC-H0537, Feb. 1-10, 2012, 5 pp.

Guo et al., "Table removal in contexts assignment of last significant position (LAST) coding", JCT-VC Meeting; MPEG Meeting; Apr. 27-May 7, 2012; Geneva, CH; (Joint Collaborative Team on Video Coding of ITU-T SG.16 WP3 ABD ISO/IEC JTC1/SC29/WG11); 7 pp.

International Search Report and Written Opinion—PCT/US2013/030886—ISA/EPO—Jun. 13, 2013, 17 pp.

ITU-T H.264, Series H: Audiovisual and Multimedia Systems, Infrastructure of audiovisual services—Coding of moving video, Advanced video coding for generic audiovisual services, Mar. 2010, 674 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Karczewicz et al., "CE5: coefficient coding with LCEC for large blocks", MPEG Meeting; Mar. 16-23, 2011; Geneva, CH; (Motion Picture Expert Group or ISO / IEC JTCI/SC29/WG11), 3 pp.

Ugur et al., "High Performance, Low Complexity Video Coding and the Emerging HEVC Standard", IEEE Transactions on Circuits and Systems for Video Technology, IEEE Service Center, Piscataway, NJ, US, vol. 20, No. 12, Dec. 1, 2010, pp. 1688-1697, 10 pp.

Seregin et al., "Binarisation modification for last position coding," JCTVC-F375, Joint Collaborative Team on Video Coding (JCT-VC) of ITU-T SG16 WP3 and ISO/IEC JTC1/SC29/WG11, 6th Meeting: Torino, IT, Jul. 14-22, 2011, 10 pp.

Hsiang et al., "Non-CE11: Modified method for coding the positions of last significant coefficients in the CABAC mode", 7th Meeting, JCT-VC Meeting; 98. MPEG Meeting; Nov. 21-30, 2011, Geneva, CH; (Joint Collaborative Team on Video Coding of ITU-T SG 16 WP3 and ISO/IEC JTC1/SC29/WG11); No . JCTVC-G239, 4 pp.

Ugur et al., "Description of video coding technology proposal by Tandberg, Nokia, Ericsson", Document: JCTVC-A119, 1st Meeting: Dresden, DE, Apr. 15-23, 2010, 33 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

\* cited by examiner

DERIVING CONTEXT FOR LAST POSITION CODING FOR VIDEO CODING

This application claims the benefit of U.S. Provisional Application Ser. Nos. 61/614,178, filed Mar. 22, 2012, 61/620,273, filed Apr. 4, 2012, and 61/666,316 filed Jun. 29, 2012, the entire contents of each of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding syntax elements associated with video data using one or more functions. For instance, a device may implement one or more of the techniques to code a value indicating a position of a last significant coefficient of a block of video data (such as a transform unit, or "TU"). To code the value, the device may use a function of an index of each bit (or "bin") in a binarized value corresponding to the last significant coefficient, where the index indicates a position of the bin in an array of bins representing the binarized value.

In one example, a method includes determining a context for entropy coding a bin of a value indicative of a last significant coefficient of a block of video data using a function of an index of the bin, and coding the bin using the determined context.

In another example, a device for coding video data includes a video coder configured to determine a context for entropy coding a bin of a value indicative of a last significant coefficient of a block of video data using a function of an index of the bin, and code the bin using the determined context.

In another example, a device includes means for determining a context for entropy coding a bin of a value indicative of a last significant coefficient of a block of video data using a function of an index of the bin, and means for coding the bin using the determined context.

In another example, a computer-readable storage medium is encoded with instructions. When executed, the instructions cause a programmable processor of a computing device to determine a context for entropy coding a bin of a value indicative of a last significant coefficient of a block of video data using a function of an index of the bin, and code the bin using the determined context.

The details of one or more examples are set forth in the accompanying drawings and the description below. Other features, objects, and advantages will be apparent from the description and drawings, and from the claims.

DETAILED DESCRIPTION

Figure 1:
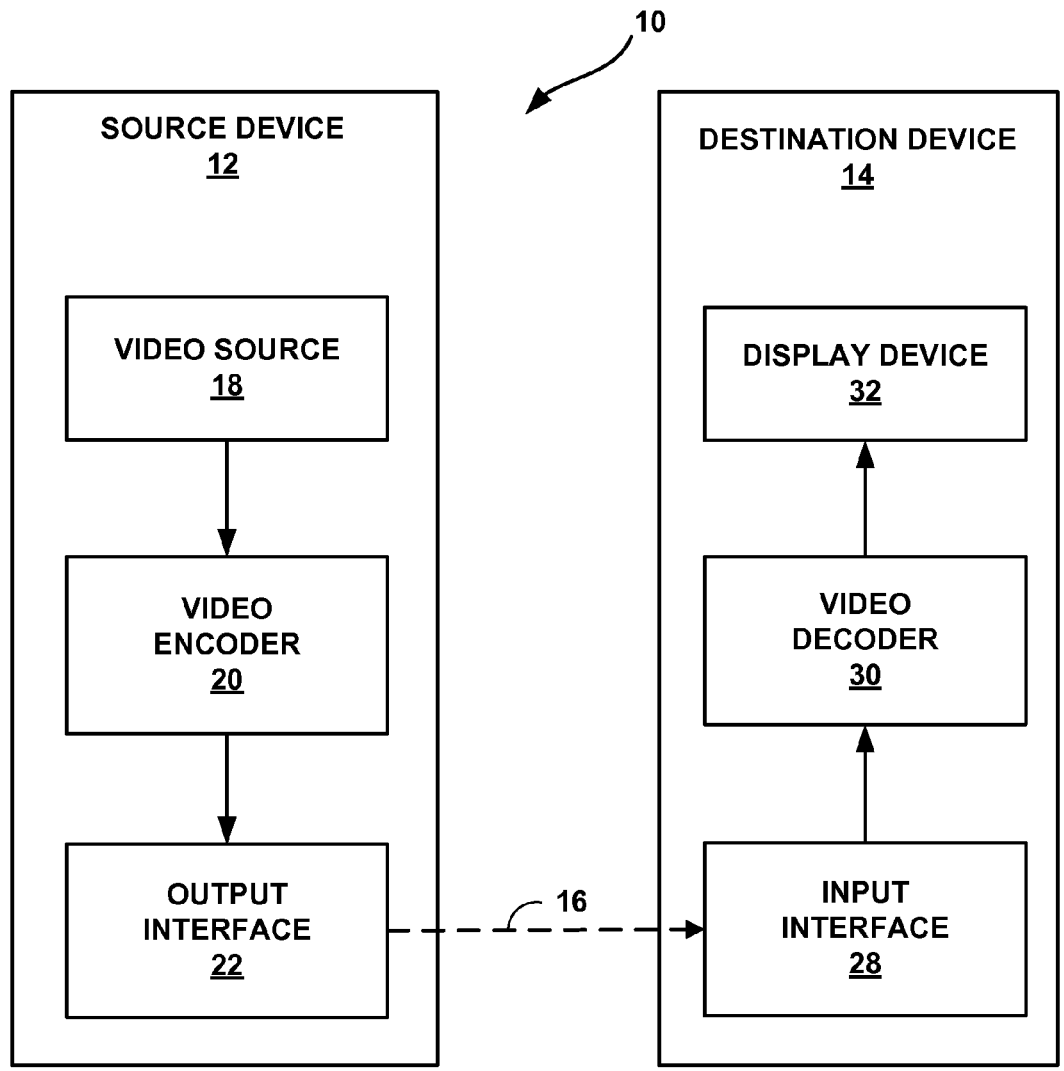
FIG. 1 is a block diagram illustrating an example video encoding and decoding system that may utilize techniques for determining a context to use to code a value representing a last significant coefficient of a block of video data.

In general, the techniques of this disclosure relate to video coding. In video coding, a sequence of pictures are individually coded using either spatial prediction (intra-prediction) or temporal prediction (inter-prediction). In particular, video coders code individual blocks of the pictures using intra- or inter-prediction. Video coders also code residual data for the blocks, where the residual data generally corresponds to residual blocks, which represent pixel-by-pixel differences between the predicted data and the raw, uncoded data. Video coders may transform and quantize the residual data to produce quantized transform coefficients for the residual blocks.

Video coders further code syntax data such as whether the coefficients are significant (e.g., have absolute values greater than zero), locations of significant coefficients, a location of a last significant coefficient in scan order, and level values for the significant coefficients.

This disclosure describes techniques for coding a value indicative of a last significant coefficient in a block of video data, such as a transform unit (TU). In particular, to code syntax elements, such as the value indicative of the last significant coefficient in the block, video coders may be configured to apply context-adaptive binary arithmetic coding (CABAC). CABAC coding involves the use of various contexts, indicated by context indexes, which generally indicate the likelihood that an individual bit (or "bin") of a binarized string will have a particular value (e.g., 0 or 1). Specifically, the context for coding a bin of a value indicative of a last significant coefficient in a block is determined individually for each bin of the value, that is, based on a location of the bin in the value (e.g., an index of the bin, assuming the value is represented as an array of bins).

Rather than using a mapping table, which provides indications of the context indexes for contexts to use to code particular bins, the techniques of this disclosure include using a function to determine the context index of a context to use to code a bin. In particular, the function may be a function of an index of the bin. For example, assuming that the bin is the $i^{th}$ bin of a value being coded, a function may be defined as f(i), where f(i) returns a context index value corresponding to a context to use to code bin i of a binarized value. The context, as described above, may indicate the likelihood that bin i will have a particular value, e.g., 0 or 1.

In this manner, this disclosure describes techniques of CABAC coding of last significant coefficient position (last position). For a last position bin to be encoded, the index of its CABAC context may be derived using a function, such that a mapping table between last position bins and CABAC contexts can be saved (e.g., not stored). CABAC coding generally includes two parts: binarization and CABAC coding. The binarization process is performed to convert the location of the last significant coefficient of a block to a binary string, e.g., an array of bins. The binarization method used in the High Efficiency Video Coding Test Model (HM) is truncated unary+fixed length encoding. For the truncated unary code part, the bins are encoded using CABAC contexts. For the fixed length part, the bins are encoded using bypass mode (without contexts). An example of 32×32 TU (transform unit/transform block) is shown in Table 1 below:

TABLE 1

| Magnitude of last position component | Truncated unary (context model) | Fixed binary (bypass) | f_value |
|---|---|---|---|
| 0 | 1 | — | 0 |
| 1 | 01 | — | 0 |
| 2 | 001 | — | 0 |
| 3 | 0001 | — | 0 |
| 4-5 | 00001 | X | 0-1 |
| 6-7 | 000001 | X | 0-1 |
| 8-11 | 0000001 | XX | 0-3 |
| 12-15 | 00000001 | XX | 0-3 |
| 16-23 | 000000001 | XXX | 0-7 |
| 24-31 | 000000000 | XXX | 0-7 |

Table 2 below illustrates an example context mapping table used in conventional HM. Table 2 shows that last positions at different locations can share the same contexts. For some bins, for example, bins 6-7 of an 8×8 block, there is no context assigned, that is because they are encoded without context (bypass mode), as shown in Table 1 above.

TABLE 2

| | Bin index | | | | | | | | | |
|---|---|---|---|---|---|---|---|---|---|---|
| | 0 | 1 | 2 | 3 | 4 | 5 | 6 | 7 | 8 | 9 |
| TU 4 × 4 | 0 | 1 | 2 | | | | | | | |
| TU 8 × 8 | 3 | 4 | 5 | 5 | 2 | | | | | |
| TU 16 × 16 | 6 | 7 | 8 | 8 | 9 | 9 | 2 | | | |
| TU 32 × 32 | 10 | 11 | 12 | 14 | 13 | 13 | 14 | 14 | 2 | |

Although conventional HM uses a table such as Table 2 to determine contexts for coding bins of a last position value (that is, a value indicating a last significant coefficient position in a block of video data), the techniques of this disclosure include the use of a function to determine the contexts for coding bins of the last position value. Thus, a table similar to Table 2 need not be in a video coder configured according to the techniques of this disclosure. In this manner, a function may be used to derive the CABAC context index for the bins in last position coding, such that the mapping table (Table 2) can be removed. Various examples of coding devices configured to execute functions to determine contexts for coding bins of syntax elements are described in greater detail below.

FIG. 1 is a block diagram illustrating an example video encoding and decoding system 10 that may utilize techniques for determining a context to use to code a value representing a last significant coefficient of a block of video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for determining a context to use to code a value representing a last significant coefficient of a block of video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining a context to use to code a value representing a last significant coefficient of a block of video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, video encoder 20 may encode a value representing a position of a last significant coefficient of a block of video data using contexts determined using one or more functions of bins of the value. Likewise, video decoder 30 may decode a value representing a last significant coefficient of a block of video data using contexts determined using one or more functions of bins of the value. Video encoder 20 and/or video decoder 30 may be configured to perform any of functions (1)-(12), described in greater detail below, or conceptually similar functions, to perform the techniques of this disclosure. In this manner, video encoder 20 and video decoder 30 represent examples of video coders configured to determine a context for entropy coding a bin of a value indicative of a last significant coefficient of a block of video data using a function of an index of the bin, and code the bin using the determined context.

As an example, "Ctx_i" may denote the index of the context used by video encoder 20 to encode the $i^{th}$ bin in the "last position" binary string. Video encoder 20 may derive Ctx_i using the following equation:

$$Ctx\_i = f(i).$$

The function denoted by f(i) may be linear or non-linear. Additionally, f(i) may be a predefined function that is accessible to both video encoder 20 and video decoder 30. Alternatively, f(i) may be selected by a user or by video encoder 20, and transmitted to video decoder 30 using one or more types of high-level syntax signaling, such as a sequence parameter set (SPS), a picture parameter set (PPS), an adaptation parameter set (APS), a frame header, a slice header, a sequence header, or other such syntax signaling. An example of one such function that video encoder 20 may execute is:

$$f(i)=(i>>1), \quad (1)$$

where ">>" denotes the binary right-shift operator. In turn, the result of f(i) may correspond to Ctx_i. That is, video encoder 20 may execute f(i) to generate an output equal to the value of Ctx_i. More specifically, video encoder 20 may execute f(i) to generate the context index of a context to be used to entropy code the $i^{th}$ bin.

Table 3 below illustrates an example of the context indexes that video encoder 20 may use to code bins at various bin indexes for various block (e.g., TU) sizes using the example function (1) described above. Although Table 3 is provided for purposes of explanation of the results of example function (1), it will be appreciated that a table such as Table 3 need not be stored in a video coding device such as source device 12 and/or destination device 14. Instead, one or both of video encoder 20 and video decoder 30 may execute function (1) above to produce the results indicated in Table 3, based on various bin indexes.

TABLE 3

| | Bin index | | | | | | | | | |
|---|---|---|---|---|---|---|---|---|---|---|
| | 0 | 1 | 2 | 3 | 4 | 5 | 6 | 7 | 8 | 9 |
| TU 4 × 4 | 0 | 0 | 1 | | | | | | | |
| TU 8 × 8 | 0 | 0 | 1 | 1 | 2 | | | | | |
| TU 16 × 16 | 0 | 0 | 1 | 1 | 2 | 2 | 3 | | | |
| TU 32 × 32 | 0 | 0 | 1 | 1 | 2 | 2 | 3 | 3 | 4 | |

As another example, video encoder 20 may execute a function that is dependent on both the bin index (i) and a size of a corresponding block (e.g., a TU). The corresponding block may be the block that includes the coefficients described by the last significant coefficient value. As an example, the context index may be produced by a function, such as:

Ctx_i=f(i, TUBlkSize), where "TUBlkSize" is a value indicative of the block size. For purposes of this disclosure, the terms "TUBlkSize" and "block_size" may be used interchangeably to indicate the block size.

As one example, the function may be:

$$f(i,\text{TUBlkSize})=i>>(\log_2(\text{TUBlkSize})-2). \quad (2)$$

Table 4 below illustrates an example of the context indexes that video encoder 20 would use to code bins at various bin indexes for various block (e.g., TU) sizes using the example function (2). Although Table 4 is provided for purposes of explanation of the results of example function (2), it will be appreciated that a table such as Table 4 need not be stored in a video coding device such as source device 12 and/or destination device 14. Instead, one or both of video encoder 20 and video decoder 30 may execute example function (2) described above to produce the results indicated in Table 4.

TABLE 4

| | Bin index | | | | | | | | | |
|---|---|---|---|---|---|---|---|---|---|---|
| | 0 | 1 | 2 | 3 | 4 | 5 | 6 | 7 | 8 | 9 |
| TU 4 × 4 | 0 | 1 | 2 | | | | | | | |
| TU 8 × 8 | 0 | 0 | 1 | 1 | 2 | | | | | |
| TU 16 × 16 | 0 | 0 | 0 | 0 | 1 | 1 | 1 | | | |
| TU 32 × 32 | 0 | 0 | 0 | 0 | 0 | 0 | 0 | 0 | 1 | |

As another example, video encoder 20 may execute the following function to derive Ctx_i:

$$f(i,\text{TUBlkSize})=i>>1+\text{TUSIZEoffset, where}$$
$$\text{TUSIZEoffset}=(\log_2(\text{TUBlkSize})-2)*(\log_2(\text{TUBlkSize})+1)/2. \quad (3)$$

Table 5 below illustrates an example of the context indexes that video encoder 20 may use to code bins at various bin indexes for various block (e.g., TU) sizes using the example function (3). Although Table 5 is provided for purposes of explanation of the results of example function (3), it will be appreciated that a table such as Table 5 need not be stored source device 12 and/or destination device 14. Instead, one or both of video encoder 20 and video decoder 30 may execute example function (3) described above to produce the results indicated in Table 5.

TABLE 5

| | Bin index | | | | | | | | | |
|---|---|---|---|---|---|---|---|---|---|---|
| | 0 | 1 | 2 | 3 | 4 | 5 | 6 | 7 | 8 | 9 |
| TU 4 × 4 | 0 | 0 | 1 | | | | | | | |
| TU 8 × 8 | 2 | 2 | 3 | 3 | 4 | | | | | |
| TU 16 × 16 | 5 | 5 | 6 | 6 | 7 | 7 | 8 | | | |
| TU 32 × 32 | 9 | 9 | 10 | 10 | 11 | 11 | 12 | 12 | 13 | |

As still another example, video encoder 20 may execute the following function to derive Ctx_i:

$$Ctx\_idx=(i+1)>>1+\text{TUSIZEoffset, where}$$
$$\text{TUSIZEoffset}=(\log_2(\text{TUBlkSize})-2)*(\log_2(\text{TUBlkSize})+1)/2. \quad (4)$$

Table 6 below illustrates an example of the context indexes that video encoder 20 may use to code bins at various bin indexes for various block (e.g., TU) sizes using the example function (4). Although Table 6 is provided for purposes of explanation of the results of the function, it will be appreciated that a table such as Table 6 need not be stored in a video coding device such as source device 12 and/or destination device 14. Instead, one or both of video encoder 20 and video decoder 30 may execute example function (4) described above to produce the results indicated in Table 6.

TABLE 6

| | Bin index | | | | | | | | | |
|---|---|---|---|---|---|---|---|---|---|---|
| | 0 | 1 | 2 | 3 | 4 | 5 | 6 | 7 | 8 | 9 |
| TU 4 × 4 | 0 | 1 | 1 | | | | | | | |
| TU 8 × 8 | 2 | 3 | 3 | 4 | 4 | | | | | |
| TU 16 × 16 | 5 | 6 | 6 | 7 | 7 | 8 | 8 | | | |
| TU 32 × 32 | 9 | 10 | 10 | 11 | 11 | 12 | 12 | 13 | 13 | |

As another example, the function may be:

$$Ctx\_idx = \text{offset} + (i >> k), \quad (5)$$

where:

$$\text{offset} = 3*n + ((n+1) >> 2), \quad (6)$$

$$k = (n+3) >> 2, \text{ and} \quad (7)$$

$$n = (\log_2(TUBlkSize) - 2). \quad (8)$$

Alternatively, example function (8) may be expressed as: $n = (\log_2(\text{block\_size}) - 2)$ for purposes of this disclosure.

Table 7 below illustrates an example of the context indexes that video encoder 20 may use to code bins at various bin indexes for various block (e.g., TU) sizes using the example functions (5)-(8). Although Table 7 is provided for purposes of explanation of the results of the functions, it will be appreciated that a table such as Table 7 need not be stored in a video coding device such as source device 12 and/or destination device 14. Instead, one or both of video encoder 20 and video decoder 30 may execute example functions (5)-(8) above to produce the results indicated in Table 7.

TABLE 7

|  | Bin index | | | | | | | | | |
|---|---|---|---|---|---|---|---|---|---|---|
|  | 0 | 1 | 2 | 3 | 4 | 5 | 6 | 7 | 8 | 9 |
| TU 4 × 4 | 0 | 1 | 2 | | | | | | | |
| TU 8 × 8 | 3 | 3 | 4 | 4 | 5 | | | | | |
| TU 16 × 16 | 6 | 6 | 7 | 7 | 8 | 8 | 9 | | | |
| TU 32 × 32 | 10 | 10 | 11 | 11 | 12 | 12 | 13 | 13 | 14 | |

Tables 8 and 9 below illustrate another example in which video encoder 20 and/or video decoder 30 may apply one or more formula-based context derivation techniques of this disclosure for bins in "last position" coding to luma and chroma components in a unified manner. In particular, Table 8 illustrates bin indexes for luma TUs of various sizes, while Table 9 provides bin indexes for chroma TUs of various sizes.

TABLE 8

| Luma | | | | | | | | | | |
|---|---|---|---|---|---|---|---|---|---|---|
|  | Bin index | | | | | | | | | |
|  | 0 | 1 | 2 | 3 | 4 | 5 | 6 | 7 | 8 | 9 |
| TU 4 × 4 | 0 | 1 | 2 | | | | | | | |
| TU 8 × 8 | 3 | 3 | 4 | 4 | 5 | | | | | |
| TU 16 × 16 | 6 | 6 | 7 | 7 | 8 | 8 | 9 | | | |
| TU 32 × 32 | 10 | 10 | 11 | 11 | 12 | 12 | 13 | 13 | 14 | |

TABLE 9

| Chroma | | | | | | | | | | |
|---|---|---|---|---|---|---|---|---|---|---|
|  | Bin index | | | | | | | | | |
|  | 0 | 1 | 2 | 3 | 4 | 5 | 6 | 7 | 8 | 9 |
| TU 4 × 4 | 0 | 1 | 2 | | | | | | | |
| TU 8 × 8 | 0 | 0 | 1 | 1 | 2 | | | | | |
| TU 16 × 16 | 0 | 0 | 1 | 1 | 2 | 2 | 3 | | | |

One example of a function that video encoder 20 and/or video decoder 30 may use for deriving contexts for bins in last position coding of luma TUs, per table 8, and chroma TUs, per table 9, is:

$$Ctx\_idx = \text{offset} + (i >> k), \quad (9)$$

where Luma and Chroma share the same value of k, $k = (n+3) >> 2$ with $n = (\log_2(TUBlkSize) - 2)$ Video encoder 20 and/or video decoder 30 may determine the values for the variable "offset" of function (9), based on whether the TU is a luma TU or a chroma TU using various functions. Examples of such functions include the following:

$$\text{Luma:offset} = 3*n + ((n+1) >> 2) \quad (10)$$

$$\text{Chroma:offset} = 0 \quad (11)$$

In this manner, function (9) represents an example of a function that video encoder 20 and/or video decoder 30 may execute to produce a context index. In turn, the context index may be indicative of a context for coding a bin of a value indicative of a last significant coefficient of a block of video data as a function of an index of the bin (i) and a value indicative of a size of the block (k, which is calculated based on n, which is $\log_2(TUBlkSize) - 2$). In this example, video encoder 20 and/or video decoder 30 may also execute example function (9) to produce the context index based on an offset value that is determined based on whether the block is a chroma block or a luma block, e.g., as shown in functions (10) and (11).

As another example, video encoder 20 may implement a step function to derive the context index of the context to be used to entropy code the $i^{th}$ bin. More specifically, the step function may represent a function that has two or more parts depending on, e.g., the value of the bin index i. Thus, video encoder 20 and/or video decoder 30 may divide the bins in the last position value into different subsets, e.g., Subset0, Subset1, etc. Additionally, video encoder 20 and/or video decoder 30 may apply different functions for different subsets, e.g., F0( ) for Subset0, F1( ) for Subset1, and so on. For instance, such a function may be as follows:

$$f(i, TublkSize) = \begin{cases} i = \text{last\_bin}, & 10 \\ \text{else} & (i >> 1) + TUSIZEoffset \end{cases}, \text{ where} \quad (12)$$

$$TUSIZEoffset = (\log_2(TUBlkSize) - 2) * (\log_2(TUBlkSize) - 1)/2.$$

In some implementations, the subsets may be pre-defined, and the definition of the subsets may be accessible to both video encoder 20 and video decoder 30. Alternatively, video encoder 20 (or a user of source device 12) may select the subsets, and output interface 22 may transmit the selected subsets to the video decoder 30 of destination device 14 using one or more high-level syntax signaling techniques, such as an SPS, a PPS, an APS, a frame header, a slice header, a sequence header, or other such syntax signaling. The definition of the subsets may also depend on various other types of information, such as the block size (e.g., the TU size), the residual quadtree (RQT) depth corresponding to the block, whether the block corresponds to a luminance component or a chrominance component, the frame size for the frame including the block (e.g., in pixel resolution), the motion compensation block size for a motion compensation block (e.g., a prediction unit (PU)) corresponding to the block, the frame-type (I/P/B) for the frame including the block, the inter-prediction direction for the corresponding motion compensation block, the motion vector amplitude for the corresponding motion compensation block, and/or a motion vector difference amplitude for the motion vector of the corresponding motion compensation block.

TABLE 10

| | Bin index | | | | | | | | | |
|---|---|---|---|---|---|---|---|---|---|---|
| | 0 | 1 | 2 | 3 | 4 | 5 | 6 | 7 | 8 | 9 |
| TU 4 × 4 | 0 | 0 | 10 | | | | | | | |
| TU 8 × 8 | 1 | 1 | 2 | 2 | 10 | | | | | |
| TU 16 × 16 | 3 | 3 | 4 | 4 | 5 | 5 | 10 | | | |
| TU 32 × 32 | 6 | 6 | 7 | 7 | 8 | 8 | 9 | 9 | 10 | |

Example functions (1)-(12) described above may depend, at least in part, on one or more elements of side information. As one example, the functions may accept the side information as arguments. In other examples, video encoder 20 and/or video decoder 30 may select different functions based on the corresponding side information. The side information may include any or all of the block size (e.g., the TU size), the residual quadtree depth (RQT) depth corresponding to the block, whether the block corresponds to a luminance component or a chrominance component, the frame size for the frame including the block (e.g., in pixel resolution), the motion compensation block size for a motion compensation block (e.g., a prediction unit (PU)) corresponding to the block, the frame-type (I/P/B) for the frame including the block, the inter-prediction direction for the corresponding motion compensation block, the motion vector amplitude for the corresponding motion compensation block, and/or a motion vector difference amplitude for the motion vector of the corresponding motion compensation block. As one example, video encoder 20 and/or video decoder 30 may select different functions to derive contexts to apply when coding bins of a value indicating a last significant coefficient position of a luminance block, vis-à-vis a chrominance block.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

In this manner, video encoder 20 and video decoder 30 represent examples of a video coder configured to determine a context for entropy coding a bin of a value indicative of a last significant coefficient of a block of video data using a function of an index of the bin, and code the bin using the determined context.

Figure 2:
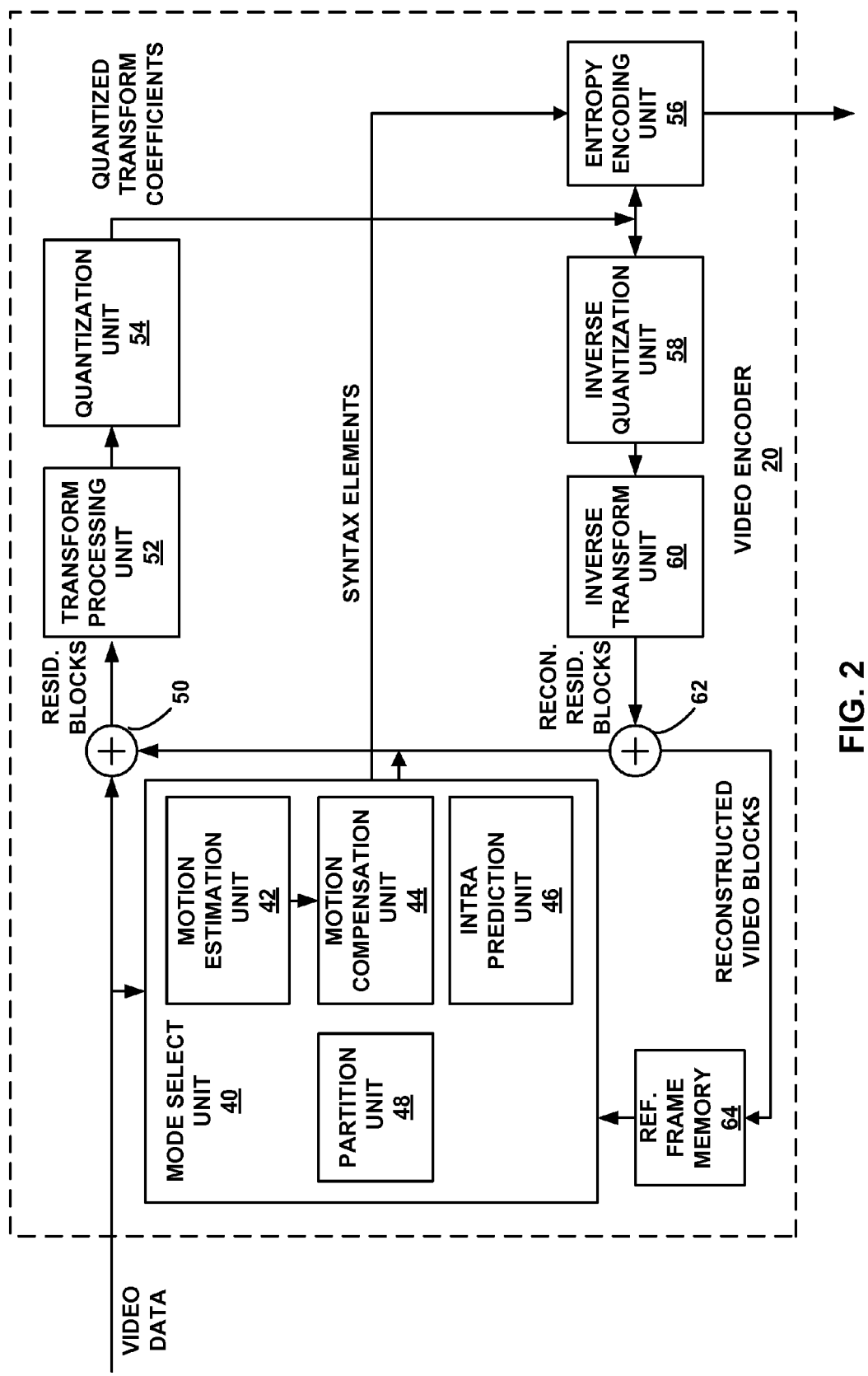
FIG. 2 is a block diagram illustrating an example of a video encoder that may implement techniques for determining a context to use to code a value representing a last significant coefficient of a block of video data.

FIG. 2 is a block diagram illustrating an example of video encoder 20 that may implement techniques for determining a context to use to code a value representing a last significant coefficient of a block of video data. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

In particular, entropy encoding unit 56 may receive, from quantization unit 54, a set of quantized transform coefficients associated with a TU. In turn, entropy encoding unit 56 may scan the set of quantized transform coefficients, and determine whether each scanned coefficient includes a significant coefficient, i.e., whether the coefficient has a zero or non-zero value. A non-zero value may indicate that a particular quantized transform coefficient is a "significant" coefficient. In instances where entropy encoding unit 56 detects a significant coefficient, entropy encoding unit 56 may code data representative of the particular value associated with the coefficient (e.g., one, two, and so on). Such data may include, for example, an indication of the sign of the coefficient, whether the absolute value of the coefficient is greater than one, and when the absolute value of the coefficient is greater than one, whether the absolute value of the coefficient is greater than two. Additionally, in instances where a significant coefficient has an absolute value greater than two, entropy encoding unit 56 may subtract two from the absolute value of the coefficient, thereby obtaining a value by which the coefficient exceeds two, and code this value.

By scanning the entire set of quantized transform coefficients received from quantization unit 54, entropy encoding unit 56 may also detect and identify the last significant coefficient associated with a particular TU (i.e., in scan order). Additionally, entropy encoding unit 56 may determine the position of the last significant coefficient within the corresponding TU. For instance, entropy encoding unit 56 may identify horizontal and vertical (x- and y-) coordinates of the last significant coefficient within the TU.

Moreover, entropy encoding unit 56 may be configured to binarize syntax elements that do not already have a binary value. That is, entropy encoding unit 56 may determine a binary string representative of the value of a syntax element when the syntax element is not already represented by a binary string. A binary string, or binarized value, generally corresponds to an array of bits, each of which may have a value of "0" or "1." The array may be zero-indexed, such that the ordinal first bit of the array occurs at position 0, the ordinal second bit of the array occurs at position 1, and so on. Thus, entropy encoding unit 56 may form a binarized value B[N] having a length of N bits, each bit occurring at a respective position B[i], where $0 \leq i \leq N-1$.

In turn, entropy encoding unit 56 may entropy encode data representing the x- and y-coordinates of the last significant coefficient. For example, entropy encoding unit 56 may be configured to entropy encode the syntax elements last_significant_coeff_x_prefix, last_significant_coeff_y_prefix, last_significant_coeff_x_suffix, and/or last_significant_coeff_y_suffix, which together, in HEVC, represent the x- and y-coordinates of the last significant coefficient in scan order. Entropy encoding unit 56 may implement one or more techniques of this disclosure to entropy encode data representing the coordinates of the last significant coefficient using a function, denoted by f(i). For example, entropy encoding unit 56 may entropy encode various syntax elements, such as syntax elements for the quantized transform coefficients received from quantization unit 54 and/or values representing a last significant coefficient of a TU (e.g., the syntax elements described above), using contexts determined using one or more functions of bins of a value representative of the corresponding syntax element.

For instance, "Ctx_i" may denote the index of the context used by entropy encoding unit 56 to encode the $i^{th}$ bin in a binarized value representing the position of the last significant coefficient, as described above with respect to Tables 1-2 and 8-9. The context indexed by ctx_i generally indicates a most probable symbol (e.g., "1" or "0,") as well as the probability of the most probable symbol. Entropy encoding unit 56 may derive the value of Ctx_i using the equation Ctx_i=f(i), where f(i) may be a predefined function accessible to entropy encoding unit 56, or a function selected by a user. Additionally, entropy encoding unit 56 may encode data representative of f(i), so that video decoder 30 may decode the data for the function f(i) and use f(i) to obtain the value of Ctx_i. In this manner, entropy encoding unit 56 can determine the context for a particular bin of a binarized syntax element using a function of the bin index, that is, the position of the bin in a binarized value (i.e., a binary string) representing the syntax element.

In some examples, entropy encoding unit 56 is configured to determine contexts for coding bins of data representing the last significant coefficient position using formulas (5)-(8) described above. That is, entropy encoding unit 56 may calculate f(i) as follows: Ctx_idx=offset+(i>>k). Moreover, entropy encoding unit 56 may derive the values of the offset value and k used in f(i) using the following equations:

$$\text{offset}=3*n+((n+1)>>2),$$

$$k=(n+3)>>2, \text{ and}$$

$$n=(\log_2(\text{block\_size})-2).$$

In other implementations, entropy encoding unit 56 may use one or more of example functions (1)-(4) and (9)-(12), in addition or in the alternative to formulas (5)-(8), when determining a context for entropy encoding a bin of data representing the position of the last significant coefficient of a TU. In this manner, video encoder 20 and components thereof, such as entropy encoding unit 56, may implement the techniques of this disclosure to encode data representative of the last significant coefficient using one or more functions. Such functions can be stored more efficiently in memory of video encoder 20 and video decoder 30 than tables. Therefore, the techniques of this disclosure may provide for video encoders and video decoders that utilize memory more efficiently, e.g., by allocating memory that would otherwise be devoted to a table to other data, or by decreasing the required amount of memory for a video encoder or video decoder.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured to determine a context for entropy coding a bin of a value indicative of a last significant coefficient of a block of video data using a function of an index of the bin, and code the bin using the determined context. Moreover, video encoder 20 also represents an example of a video encoder in which the function produces a context index for the context by right-shifting the index of the bin by a value k and adding the right-shifted value to an offset value, wherein the offset value is determined according to the formula offset=3*n+((n+1)>>2), wherein the value k is determined according to the formula k=(n+3)>>2, and wherein the value n is determined according to the formula n=(log$_2$ (block_size)−2).

Figure 3:
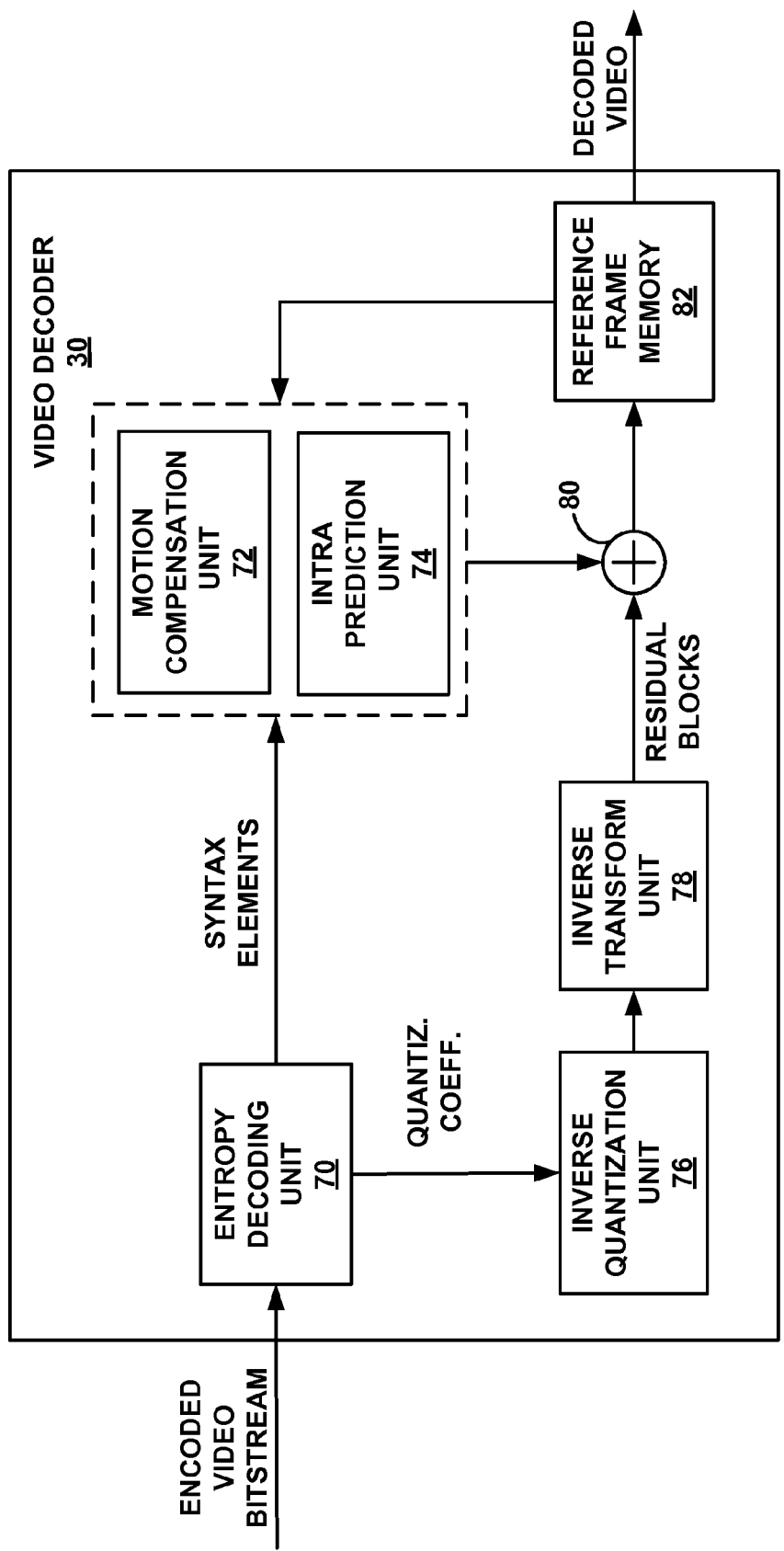
FIG. 3 is a block diagram illustrating an example of a video decoder that may implement techniques for determining a context to use to code a value representing a last significant coefficient of a block of video data.

FIG. 3 is a block diagram illustrating an example of video decoder 30 that may implement techniques for determining a context to use to code a value representing a last significant coefficient of a block of video data. In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

Entropy decoding unit 70 may generate a block (e.g., a TU) of quantized coefficients by entropy decoding the encoded video bitstream, and populating entropy decoded quantized coefficients in the block in scan order. For instance, entropy decoding unit 70 may entropy decode syntax elements of the encoded video bitstream to determine locations of significant coefficients in the block to be generated. If a location of the block corresponds to a coefficient that is not a significant coefficient, entropy decoding unit 70 may set the value of the coefficient at that location in the block to zero. On the other hand, if entropy decoding unit 70 determines that a particular quantized coefficient is a significant coefficient, entropy decoding unit 70 may set the value of the significant coefficient based on data provided in the encoded video bitstream by video encoder 20.

Moreover, as explained below, entropy decoding unit 70 may determine the position of a last significant coefficient in the block based on syntax elements indicating the x- and y-coordinates of the last significant coefficient. In accordance with the techniques of this disclosure, as explained in greater detail below, entropy decoding unit 70 may use a function to determine context for entropy decoding bins of values representing the x- and y-coordinates of the last significant coefficient. Video decoder 30 may use the indication of the position of the last significant coefficient to determine when data of the bitstream represents subsequent syntax elements, that is, syntax elements that do not represent data of the block being regenerated.

Entropy decoding unit 70 may determine, based on data provided in the encoded video bitstream, a sign for each significant coefficient, and data representing the level value of each significant coefficient. For example, entropy decoding unit 70 may determine a sign for a significant coefficient through entropy decoding a syntax element representing the sign, e.g., coeff_sign_flag. In addition, entropy decoding unit 70 may decode one or more syntax elements representative of the level value of each significant coefficient, e.g., coeff_abs_level_greater1_flag, coeff_abs_level_greater2_flag, and coeff_abs_level_remaining. In general, coeff_abs_level_greater1_flag indicates whether the absolute value of a significant coefficient is greater than 1, coeff_abs_level_greater2_flag indicates whether the absolute value of a significant coefficient is greater than 2, and coeff_abs_level_remaining indicates the absolute value of a significant coefficient minus 2.

Entropy decoding unit 70 may also determine the position of the last significant coefficient of the block (e.g., the TU) being regenerated. More specifically, entropy decoding unit 70 may identify the position (e.g., based on coded syntax elements representative of x- and y-coordinates) of the last significant coefficient within the TU associated with the encoded video bitstream. Based on identifying the position of the last significant coefficient, entropy decoding unit 70 may set the values of remaining coefficients in the TU in scan order to zero. That is, video decoder 30 need not receive any syntax elements for coefficients beyond the last significant coefficient, and further, may infer values of 0 for these coefficients.

Additionally, entropy decoding unit 70 may implement one or more techniques of this disclosure to decode bins of a binarized value representing the x- and y-coordinates of the position of the last significant coefficient using a function, generally denoted by f(i), where i corresponds to the position of the bin in the binarized value. In some examples, entropy decoding unit 70 may decode encoded data using a determined context to reproduce a value for the bin, e.g., "0" or "1." Although described as corresponding to the last significant coefficient position, the techniques of this disclosure can be applied to entropy decoding other syntax elements as well. For example, entropy decoding unit 70 may entropy decode various syntax elements, such as syntax elements for the quantized coefficients sent to one or both of motion compensation unit 72 and intra prediction unit 74, syntax elements representative of quantized transform coefficients, and/or values representing a last significant coefficient of the TU associated with the encoded video bitstream, using contexts determined using one or more functions of bin indexes of a value representative of the corresponding syntax element.

For instance, "Ctx_i" may denote the index of the context used by entropy decoding unit 70 to decode the $i^{th}$ bin in a binarized value representing the position of the last significant coefficient, as described above with respect to Tables 1-2 and 8-9. In this example, entropy decoding unit 70 may derive the value of Ctx_i using the equation Ctx_i=f(i), where f(i) may be a predefined function accessible to entropy decoding unit 70 (e.g., communicated by source device 12), or a function selected by a user. Additionally, entropy decoding unit 70 may decode data representative of f(i), so as to use the data representative of f(i) to obtain the value of Ctx_i.

In some examples, entropy decoding unit 70 is configured to determine contexts for decoding bins of data representing the last significant coefficient position using formulas (5)-(8) described above. That is, entropy decoding unit 70 may calculate f(i) as follows: Ctx_idx=offset+(i>>k). Moreover, entropy decoding unit 70 may derive the values of the offset value and k used in f(i) using the following equations:

$$\text{offset}=3*n+((n+1)>>2),$$

$$k=(n+3)>>2, \text{ and}$$

$$n=(\log_2(\text{block\_size})-2).$$

In other implementations, entropy decoding unit 70 may set f(i) to one or more of example equations (1)-(4) and (9)-(12) in decoding the last significant coefficient of a TU represented by the encoded video bitstream. In this manner, video decoder 30 and components thereof, such as entropy decoding unit 70, may implement the techniques of this disclosure to decode the last significant coefficient using one or more functions. Such functions can be stored more efficiently in memory of video encoder 20 and video decoder 30 than tables. Therefore, the techniques of this disclosure may provide for video encoders and video decoders that utilize memory more efficiently, e.g., by allocating memory that would otherwise be devoted to a table to other data, or by decreasing the required amount of memory for a video encoder or video decoder.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference frame memory 82, which stores reference pictures used for subsequent motion compensation. Reference frame memory 82 also stores decoded video for later presentation on a display device, such as display device 32 of FIG. 1.

In this manner, video decoder 30 of FIG. 3 represents an example of a video decoder configured to determine a context for entropy coding a bin of a value indicative of a last significant coefficient of a block of video data using a function of an index of the bin, and code the bin using the determined context. Moreover, video decoder 30 also represents an example of a video decoder in which the function produces a context index for the context by right-shifting the index of the bin by a value k and adding the right-shifted value to an offset value, wherein the offset value is determined according to the formula offset=3*n+((n+1)>>2), wherein the value k is determined according to the formula k=(n+3)>>2, and wherein the value n is determined according to the formula n=(log2 (block_size)−2).

Figure 4:
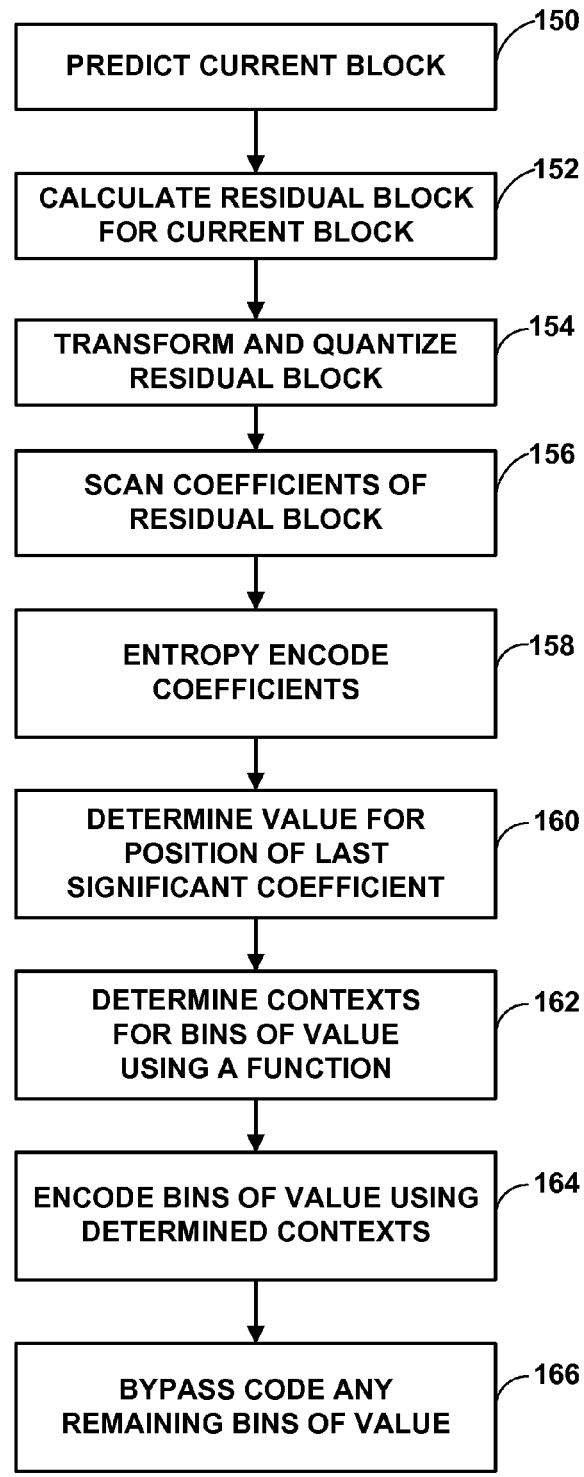
FIG. 4 is a flowchart illustrating an example method for encoding a current block of video data.

FIG. 4 is a flowchart illustrating an example method for encoding a current block. The current block may comprise a current CU or a portion of the current CU. Although described with respect to video encoder 20 (FIGS. 1 and 2), it should be understood that other devices may be configured to perform a method similar to that of FIG. 4. Moreover, although the example method of FIG. 4 specifically describes coding syntax elements relating to the position of the last significant coefficient of a video block using these techniques, it should be understood that these techniques may be applied to coding other syntax elements as well.

In this example, video encoder 20 initially predicts the current block (150). For example, video encoder 20 may calculate one or more prediction units (PUs) for the current block. Video encoder 20 may then calculate a residual block for the current block, e.g., to produce a transform unit (TU) (152). To calculate the residual block, video encoder 20 may calculate a difference between the original, uncoded block and the predicted block for the current block. Video encoder 20 may then transform and quantize coefficients of the residual block (154). Next, video encoder 20 may scan the quantized transform coefficients of the residual block (156). During the scan, or following the scan, video encoder 20 may entropy encode the coefficients (158). For example, video encoder 20 may encode the coefficients using CAVLC or CABAC.

Video encoder 20 may also determine a value for a position of a last significant coefficient in the TU (160). The value may comprise, for example, a binarized value representative of the position of the last significant coefficient, e.g., as described with respect to Table 1 above. A maximum number of bins of the value may be coded using CABAC, while other bins exceeding the maximum number may be bypass coded, again as described with respect to Table 1. In particular, in accordance with the techniques of this disclosure, video encoder 20 may determine contexts for bins of the value using a function (162). As explained above, the contexts may describe probabilities of the bins having a particular value, e.g., "0" or "1." The function may correspond to one of functions (1)-(12) described above, or a conceptually similar function.

With respect to the examples of functions (5)-(8), video encoder 20 may determine a context, ctx_idx, for a bin at position i of a binarized value representative of a position of a last significant coefficient, using the formula offset+(i>>k), where offset=3*n+((n+1)>>2), k=(n+3)>>2, and n=(log$_2$ (block_size)−2). That is, video encoder 20 may iterate through each bin to be entropy encoded and execute the functions shown above to determine a context for coding a bin of the current iteration. Video encoder 20 may then encode the bins of the value (e.g., the bins not in excess of the maximum number of bins) using the determined contexts (164). Likewise, video encoder 20 may bypass code any remaining bins of the value (166).

In this manner, the method of FIG. 4 represents an example of a method including determining a context for entropy coding a bin of a value indicative of a last significant coefficient of a block of video data using a function of an index of the bin, and coding the bin using the determined context. Moreover, the function may produce a context index for the context by right-shifting the index of the bin by a value k and adding the right-shifted value to an offset value, wherein the offset value is determined according to the formula offset=3*n+((n+1)>>2), wherein the value k is determined according to the formula k=(n+3)>>2, and wherein the value n is determined according to the formula n=(log$_2$(block_size)−2).

Figure 5:
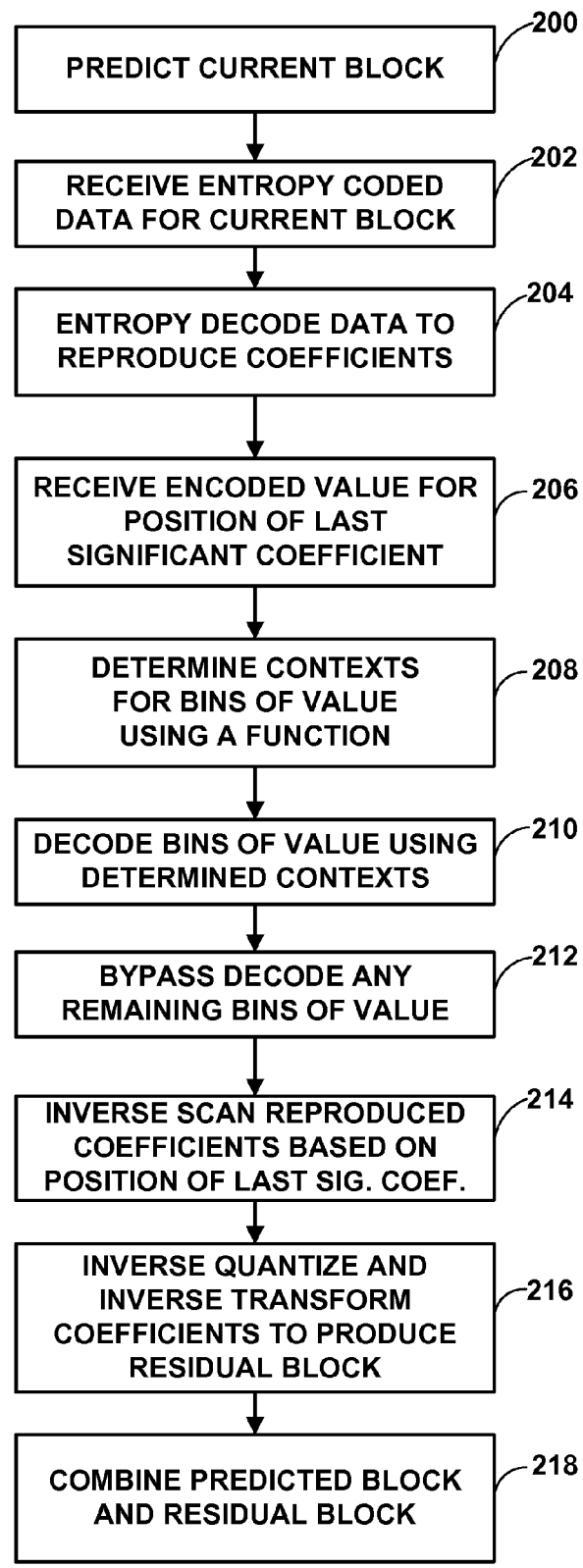
FIG. 5 is a flowchart illustrating an example method for decoding a current block of video data.

FIG. 5 is a flowchart illustrating an example method for decoding a current block of video data. The current block may comprise a current CU or a portion of the current CU. Although described with respect to video decoder 30 (FIGS. 1 and 3), it should be understood that other devices may be configured to perform a method similar to that of FIG. 5. Moreover, although the example method of FIG. 4 specifically describes coding syntax elements relating to the position of the last significant coefficient of a video block using these techniques, it should be understood that these techniques may be applied to coding other syntax elements as well.

Video decoder 30 may predict the current block (200), e.g., using an intra- or inter-prediction mode to calculate a predicted block for the current block. Video decoder 30 may also receive entropy coded data for the current block, such as entropy coded data for coefficients of a residual block corresponding to the current block (202). Video decoder 30 may entropy decode the entropy coded data to reproduce coefficients of the residual block (204).

In accordance with the techniques of this disclosure, video decoder 30 may receive an encoded value indicative of a position of a last significant coefficient in the TU (206). A maximum number of bins of the value may be decoded using CABAC, while other bins exceeding the maximum number may be bypass decoded, as described with respect to Table 1. In particular, in accordance with the techniques of this disclosure, video decoder 30 may determine contexts for bins of the value using a function (208). As explained above, the contexts may describe probabilities of the bins having a particular value, e.g., "0" or "1." The function may correspond to one of functions (1)-(12) described above, or a conceptually similar function.

With respect to the examples of functions (5)-(8), video decoder 30 may determine a context, ctx_idx, for a bin at position i of a binarized value being decoded, where the binarized value is representative of a position of a last significant coefficient, using the formula offset+(i>>k), where offset=3*n+((n+1)>>2), k=(n+3)>>2, and n=(log$_2$(block_size)−2). That is, video decoder 30 may iteratively decode each bin to be entropy decoded and execute the functions shown above to determine a context for coding a bin of the current iteration. Video decoder 30 may then decode the bins of the value (e.g., the bins not in excess of the maximum number of bins) using the determined contexts (210). For instance, video decoder 30 may decode encoded data received from video encoder 20 using the determined contexts to reproduce or otherwise obtain the bins of the value. Likewise, video decoder 30 may bypass decode any remaining bins of the value (212).

Video decoder 30 may then inverse scan the reproduced coefficients based on the position of the last significant coefficient (214), to create a block of quantized transform coefficients. That is, video decoder 30 may place the decoded coefficients in the TU, starting at the position of the last significant coefficient, and proceeding in a scan order that generally corresponds to the scan order used by the encoder.

Video decoder 30 may then inverse quantize and inverse transform the coefficients to produce a residual block (216). Video decoder 30 may ultimately decode the current block by combining the predicted block and the residual block (218).

In this manner, the method of FIG. 5 represents an example of a method including determining a context for entropy coding a bin of a value indicative of a last significant coefficient of a block of video data using a function of an index of the bin, and coding the bin using the determined context. Moreover, the function may produce a context index for the context by right-shifting the index of the bin by a value k and adding the right-shifted value to an offset value, wherein the offset value is determined according to the formula offset=3*n+((n+1)>>2), wherein the value k is determined according to the formula k=(n+3)>>2, and wherein the value n is determined according to the formula n=(log$_2$(block_size)−2).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining a context for entropy coding a bin of a value indicative of a last significant coefficient of a block of video data using a function of an index of the bin,
      wherein the function produces a context index for the context by right-shifting the index of the bin by a value k and adding the right-shifted value to an offset value,
      wherein the offset value is determined according to the formula:
         offset=3*n+((n+1)>>2),
      wherein the value k is determined according to the formula:
         k=(n+3)>>2,
      wherein the value n is determined according to the formula:
         n=(log$_2$(block_size)−2), and
      wherein the value block_size comprises a value indicative of the size of the block; and
   coding the bin using the determined context.

2. The method of claim 1, wherein determining the context comprises executing the function.

3. The method of claim 1, wherein the function comprises a linear function.

4. The method of claim 1, wherein the function comprises a non-linear function.

5. The method of claim 1, wherein the function produces a context index for the context by right-shifting the index of the bin by one.

6. The method of claim 1, further comprising receiving the function from a user.

7. The method of claim 1, further comprising receiving syntax data defining the function.

8. The method of claim 1, wherein coding the bin comprises entropy decoding encoded data using the determined context to reproduce a value for the bin.

9. The method of claim 1, wherein coding the bin comprises entropy encoding the bin using the determined context.

10. A device for coding video data, the device comprising:
    a memory configured to store the video data; and
    one or more processors configured to:
       determine a context for entropy coding a bin of a value indicative of a last significant coefficient of a block of video data using a function of an index of the bin,
          wherein the function produces a context index for the context by right-shifting the index of the bin by a value k and adding the right-shifted value to an offset value,
          wherein the offset value is determined according to the formula:
             offset=3*n+((n+1)>>2),
          wherein the value k is determined according to the formula:
             k=(n+3)>>2,
          wherein the value n is determined according to the formula:
             n=(log$_2$(block_size)−2), and
          wherein the value block_size comprises a value indicative of the size of the block; and
       code the bin using the determined context.

11. The device of claim 10, wherein the video coder is configured to determine the context at least in part by executing the function.

12. The device of claim 10, wherein the video coder is further configured to receive syntax data defining the function.

13. The device of claim 10, wherein the video coder is configured to code the bin at least in part by entropy decoding encoded data using the determined context to reproduce a value for the bin.

14. The device of claim 10, wherein the video coder is configured to code the bin at least in part by entropy encoding the bin using the determined context.

15. The device of claim 10, wherein the device comprises at least one of:
    an integrated circuit;
    a microprocessor; and
    a wireless communication device that comprises the video coder.

16. A device for coding video data, the device comprising:
    means for determining a context for entropy coding a bin of a value indicative of a last significant coefficient of a block of video data using a function of an index of the bin,
       wherein the function produces a context index for the context by right-shifting the index of the bin by a value k and adding the right-shifted value to an offset value,
       wherein the offset value is determined according to the formula:
          offset=3*n+((n+1)>>2),
       wherein the value k is determined according to the formula:
          k=(n+3)>>2,
       wherein the value n is determined according to the formula:
          n=(log$_2$(block_size)−2), and
       wherein the value block_size comprises a value indicative of the size of the block; and
    means for coding the bin using the determined context.

17. The device of claim 16, wherein the means for determining the context comprises means for executing the function.

18. The device of claim 16, further comprising means for receiving syntax data defining the function.

19. A computer-readable storage medium encoded with instructions that, when executed, cause a programmable processor of a computing device to:
 determine a context for entropy coding a bin of a value indicative of a last significant coefficient of a block of video data using a function of an index of the bin,
  wherein the function produces a context index for the context by right-shifting the index of the bin by a value k and adding the right-shifted value to an offset value,
  wherein the offset value is determined according to the formula:
   $\text{offset}=3*n+((n+1)>>2)$,
  wherein the value k is determined according to the formula:
   $k=(n+3)>>2$,
  wherein the value n is determined according to the formula:
   $n=(\log_2(\text{block\_size})-2)$, and
  wherein the value block_size comprises a value indicative of the size of the block; and
 code the bin using the determined context.

20. The computer-readable storage medium of claim 19, wherein the instructions that cause the programmable processor to determine the context further include instructions that cause the programmable processor to execute the function.

21. The computer-readable storage medium of claim 19, further encoded with instructions that, when executed, cause the programmable processor to receive syntax data defining the function.

\* \* \* \* \*